US007634516B2

(12) United States Patent
Cannon et al.

(10) Patent No.: US 7,634,516 B2
(45) Date of Patent: *Dec. 15, 2009

(54) MAINTAINING AN AGGREGATE INCLUDING ACTIVE FILES IN A STORAGE POOL IN A RANDOM ACCESS MEDIUM

(75) Inventors: David Maxwell Cannon, Tucson, AZ (US); Howard Newton Martin, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 245 days.

This patent is subject to a terminal disclaimer.

(21) Appl. No.: 11/206,496

(22) Filed: Aug. 17, 2005

(65) Prior Publication Data

US 2007/0043787 A1   Feb. 22, 2007

(51) Int. Cl.
*G06F 12/00* (2006.01)
(52) U.S. Cl. .................. 707/203; 707/200; 707/202; 707/204; 707/205
(58) Field of Classification Search ....................... None
See application file for complete search history.

(56) References Cited

U.S. PATENT DOCUMENTS

| 5,644,766 A | * | 7/1997 | Coy et al. ................ 707/204 |
| 5,761,677 A | * | 6/1998 | Senator et al. ............ 707/203 |
| 5,819,295 A | | 10/1998 | Nakagawa et al. |
| 5,920,867 A | | 7/1999 | Van Huben et al. |
| 5,983,239 A | | 11/1999 | Cannon |
| 6,021,415 A | | 2/2000 | Cannon et al. |
| 6,023,706 A | | 2/2000 | Schmuck et al. |
| 6,098,074 A | | 8/2000 | Cannon et al. |

(Continued)

FOREIGN PATENT DOCUMENTS

JP   62281038   12/1987

OTHER PUBLICATIONS

U.S. Application entitled "Maintaining an Aggregate Including Active Files in a Storage Pool", filed Aug. 15, 2005, serial number not yet assigned, by inventors D.M. Cannon and H.N. Martin.

(Continued)

*Primary Examiner*—Khanh B Pham
*Assistant Examiner*—Andalib F Lodhi
(74) *Attorney, Agent, or Firm*—David W. Victor; Konrad Raynes and Victor LLP

(57) ABSTRACT

Provided are a method, system, and program for maintaining an aggregate including active files in a storage pool in a random access medium. An active-only storage pool is configured in a random access device. The active-only storage pool is intended to include only active files and not inactive versions of files. A plurality of files in the active-only storage pool are associated with a precursor aggregate in the active-only storage pool. One file associated with the precursor aggregate in the active only storage pool is deactivated to produce an inactive version of the deactivated file. The precursor aggregate is associated with the inactive version of the file in response to the deactivation. A determination is made of the inactive version of at least one file in the precursor aggregate. The determined inactive version of the at least one file is deleted from the active only storage pool.

41 Claims, 7 Drawing Sheets

U.S. PATENT DOCUMENTS

| | | | |
|---|---|---|---|
| 6,330,572 B1 | 12/2001 | Sitka | |
| 6,351,753 B1* | 2/2002 | Jagadish et al. | 707/203 |
| 6,366,988 B1 | 4/2002 | Skiba et al. | |
| 6,886,018 B1* | 4/2005 | Boudris et al. | 707/203 |
| 6,889,249 B2 | 5/2005 | Miloushev et al. | |
| 7,024,429 B2 | 4/2006 | Ngo et al. | |
| 7,039,661 B1* | 5/2006 | Ranade | 707/204 |
| 7,069,401 B1* | 6/2006 | Noonan et al. | 711/162 |
| 7,096,330 B1* | 8/2006 | Root et al. | 711/162 |
| 7,130,970 B2* | 10/2006 | Devassy et al. | 711/154 |
| 7,191,552 B1* | 3/2007 | Husom | 36/144 |
| 7,243,103 B2 | 7/2007 | Murphy et al. | |
| 2001/0042073 A1* | 11/2001 | Saether et al. | 707/203 |
| 2002/0120763 A1* | 8/2002 | Miloushev et al. | 709/203 |
| 2003/0078930 A1* | 4/2003 | Surcouf et al. | 707/10 |
| 2003/0154220 A1 | 8/2003 | Cannon | |
| 2003/0154238 A1* | 8/2003 | Murphy et al. | 709/201 |
| 2004/0133577 A1 | 7/2004 | Miloushev et al. | |
| 2004/0186826 A1 | 9/2004 | Choi et al. | |
| 2004/0199521 A1 | 10/2004 | Anglin et al. | |
| 2005/0137731 A1* | 6/2005 | Haag et al. | 700/97 |
| 2005/0165722 A1 | 7/2005 | Cannon et al. | |
| 2005/0229031 A1* | 10/2005 | Kojenov et al. | 714/6 |
| 2007/0005666 A1* | 1/2007 | Klein et al. | 707/203 |
| 2007/0043785 A1 | 2/2007 | Cannon et al. | |
| 2007/0043788 A1 | 2/2007 | Cannon et al. | |
| 2007/0043789 A1 | 2/2007 | Cannon et al. | |

OTHER PUBLICATIONS

J.J. Daudenarde, et al., "Implementation of a File System with a Fast and Selective Recovery", IBM Corporation, Technical Disclosure Bulletin, Feb. 1987, pp. 3837-3838.

PCT International Search Report and Written Opinion mailed Nov. 13, 2006 for PCT/EP2006/063455 filed Jun. 22, 2006.

EPO document entitled "Communication pursuant to Article 94(3) EPC" dated Jun. 9, 2008, pp. 1-6, for application Serial No. 06 777 449.7-2201.

EPO document entitled "Communication pursuant to Article 94(3) EPC" dated Jun. 6, 2008, pp. 1-5, for application Serial No. 06-763 848.6-2201.

EPO, "Communication pursuant to Article 94(3) EPC", dated on Jun. 6, 2008, pp. 1-5, for application No. 06 763 848.6-2201.

First Office Action for U.S. Appl. No. 11/206,488, dated Dec. 11, 2007, 20 pp.

Final Office Action, for U.S. Appl. No. 11/206,488, dated Jun. 12, 2008, 15 pp.

Notice of Allowance for U.S. Appl. No. 11/206,488, dated Dec. 15, 2008, 10 pp.

First Office Action for U.S. Appl. No. 11/224,852, dated Dec. 27, 2007, 16 pp.

Final Office Action for U.S. Appl. No. 11/224,852, dated Jun. 25, 2008, 15 pp.

Notice of Allowance for U.S. Appl. No. 11/224,852, dated Jan. 6, 2009, 15 pp.

First Office Action for U.S. Appl. No. 11/224,768, dated Dec. 13, 2007, 16 pp.

Final Office Action for U.S. Appl. No. 11/224,768, dated Jun. 11, 2008, 14 pp.

Notice of Allowance for U.S. Appl. No. 11/224,768, dated Dec. 16, 2008, 10 pp.

PCT International Search Report and Written Opinion mailed Nov. 10, 2006 for PCT/EP2006/063511 filed Jun. 23, 2006.

Translation of First Office Action from Chinese (PRC) Patent Office for Application No. 2006800283841, dated Jul. 17, 2009, 10 pp.

First Office Action, dated Jul. 17, 2009, for CN Application No. 2006800283841, 5 pp.

Translation of First Office Action from Chinese (PRC) Patent Office for Application No. 2006800283150, dated Jul. 17, 2009, 10 pp.

First Office Action, dated Jul. 17, 2009, for CN Application No. 2006800283150, 7 pp.

Translation of First Office Action from Chinese (PRC) Patent Office for Application No. 2006800283841, dated Jul. 17, 2009, 10 pp.

First Office Action, dated Jul. 17, 2009, for CN Application No. 20068000283841, 5 pp.

* cited by examiner

US 7,634,516 B2

MAINTAINING AN AGGREGATE INCLUDING ACTIVE FILES IN A STORAGE POOL IN A RANDOM ACCESS MEDIUM

BACKGROUND OF THE INVENTION

1. Field of the Invention

The present invention relates to a method, system, and program for maintaining an aggregate including active files in a storage pool in a random access device.

2. Description of the Related Art

Storage management software maintains a repository for data by backing-up, archiving or migrating data from client nodes in a computer network. A storage management server stores data objects or files in one or more storage pools maintained in storage devices. The storage management server may use a database to track information about the stored files, including their location, status, policy information on the files, etc. The storage management software may also be used to restore data. The storage management software may maintain a hierarchy of storage devices, where a first level of the hierarchy includes the faster access devices, such as disk drives, storing more frequently used and accessed files. Lower levels in the hierarchy provide slower access storage devices, such as lower performance disk drives and tape drives, to store less frequently accessed or inactive data. One example of storage management software is the Tivoli® Storage Manager product marketed by International Business Machines Corporation (IBM®). (Tivoli and IBM are registered trademarks of IBM).

To improve data transfer performance, the storage management software may aggregate individual files in a storage pool, so that moving and copying operations may be performed with respect to an aggregate of files instead of single files. U.S. Pat. No. 6,098,074 describes an aggregation technique in which objects being stored are aggregated into a "managed file." The objects may thereafter be tracked and moved as a single managed file within the storage hierarchy. When appropriate, individual objects can be processed individually such as for deletion or retrieval operations. The co-pending and commonly assigned patent application entitled "Method, System, And Program For Storing Data For Retrieval And Transfer", having Ser. No. 10/766,576 and filed on Jan. 27, 2004, describes further techniques for managing files in aggregates.

As the amount of data users store in storage pools continues to increase, files and aggregates of files are increasingly migrated to lower levels in the storage hierarchy. Thus, data that may need to be restored may have been migrated to a slower access device, such as a tape storage media, which has a low restore performance. Further, to restore data from tape, the data may first be staged from tape to a hard disk drive pool and then restored from the hard disk drive.

Further improvements in data storage may be useful in a variety of applications.

SUMMARY

Provided are a method, system, and program for maintaining an aggregate including active files in a storage pool in a random access medium. An active-only storage pool is configured in a random access device. The active-only storage pool is intended to include only active files and not inactive versions of files. A plurality of files in the active-only storage pool are associated with a precursor aggregate in the active-only storage pool. One file associated with the precursor aggregate in the active only storage pool is deactivated to produce an inactive version of the deactivated file. The precursor aggregate is associated with the inactive version of the file in response to the deactivation. A determination is made of the inactive version of at least one file in the precursor aggregate. The determined inactive version of the at least one file is deleted from the active only storage pool.

In a further embodiment, the file is deactivated as a result of an update to the file. Updating the file produces an active version of the file in addition to the inactive version of the file. Indication of the association of the deleted inactive version of the at least one file with the precursor aggregate is removed. The precursor aggregate is associated with only the active version of files in response to removing the indication.

In a further embodiment, the files associated with the precursor aggregate are copied to an aggregate managed file in an additional storage pool before deleting the determined inactive version of the at least one file. The aggregate managed file maintains the inactive version of the at least one file deleted from the active only storage pool.

In a further embodiment, the files are written sequentially to the aggregate managed file and the aggregate managed file comprises a sequential file.

In a further embodiment, the additional storage pool is implemented in a sequential access device.

In a further embodiment, the precursor aggregate has a first identifier and the aggregate managed file has a second identifier. A data structure is provided having information on defined aggregates including an aggregate identifier and storage pool including the aggregate for each indicated aggregate. Indication is made in the information for the aggregate identified by one aggregate identifier whether the aggregate is a precursor aggregate comprising an association of files or an aggregate managed file in which files are written.

In a further embodiment, indicating in the data structure information that the aggregate is the precursor aggregate comprises indicating that the precursor aggregate has an aggregate size of zero. Indicating in the information that the aggregate is the aggregate managed file comprises indicating that the aggregate managed file has an aggregate size that is a cumulative size of the files written in the aggregate managed file.

In a further embodiment, the information for each aggregate in the data structure includes a logical size and an actual size. Indicating that the precursor aggregate has the aggregate size of zero comprises indicating that the actual size of the precursor aggregate is zero and indicating that the aggregate managed file has the aggregate size that is the cumulative size comprises indicating that the actual size of the aggregate managed file is the cumulative size. Indication is made in the information for the precursor aggregate and the aggregate managed file that the logical size is the cumulative size of the files associated with the precursor aggregate and written to the aggregate managed file, respectively.

In a further embodiment, the file is deactivated as a result of an update to the file. Updating the file produces an active version of the file in addition to the inactive version of the file. Information is added to the data structure for the updated file having a third identifier and indicating that the updated file is in the active-only storage pool.

In a further embodiment, the data structure comprises a first data structure. A second data structure has information on each file grouped in one aggregate including the aggregate identifier of the aggregate including the file. The aggregate identifier for the files associated with the precursor aggregate comprises the first identifier and the aggregate identifier for the files written to the aggregate managed file comprises the second identifier.

In a further embodiment, the information is deleted in the second data structure for the inactive version of the at least one file having the first identifier that was deleted from the active storage pool. The second data structure includes information on the inactive version of the at least one file having the second identifier maintained in the aggregate managed file.

In a further embodiment, the information for the files in the second data structure indicates an offset and file size of the file. Files associated with one precursor aggregate have an offset of zero and files included in one aggregate managed file have an offset at which the file is stored in the aggregate managed file.

DETAILED DESCRIPTION

Figure 1:
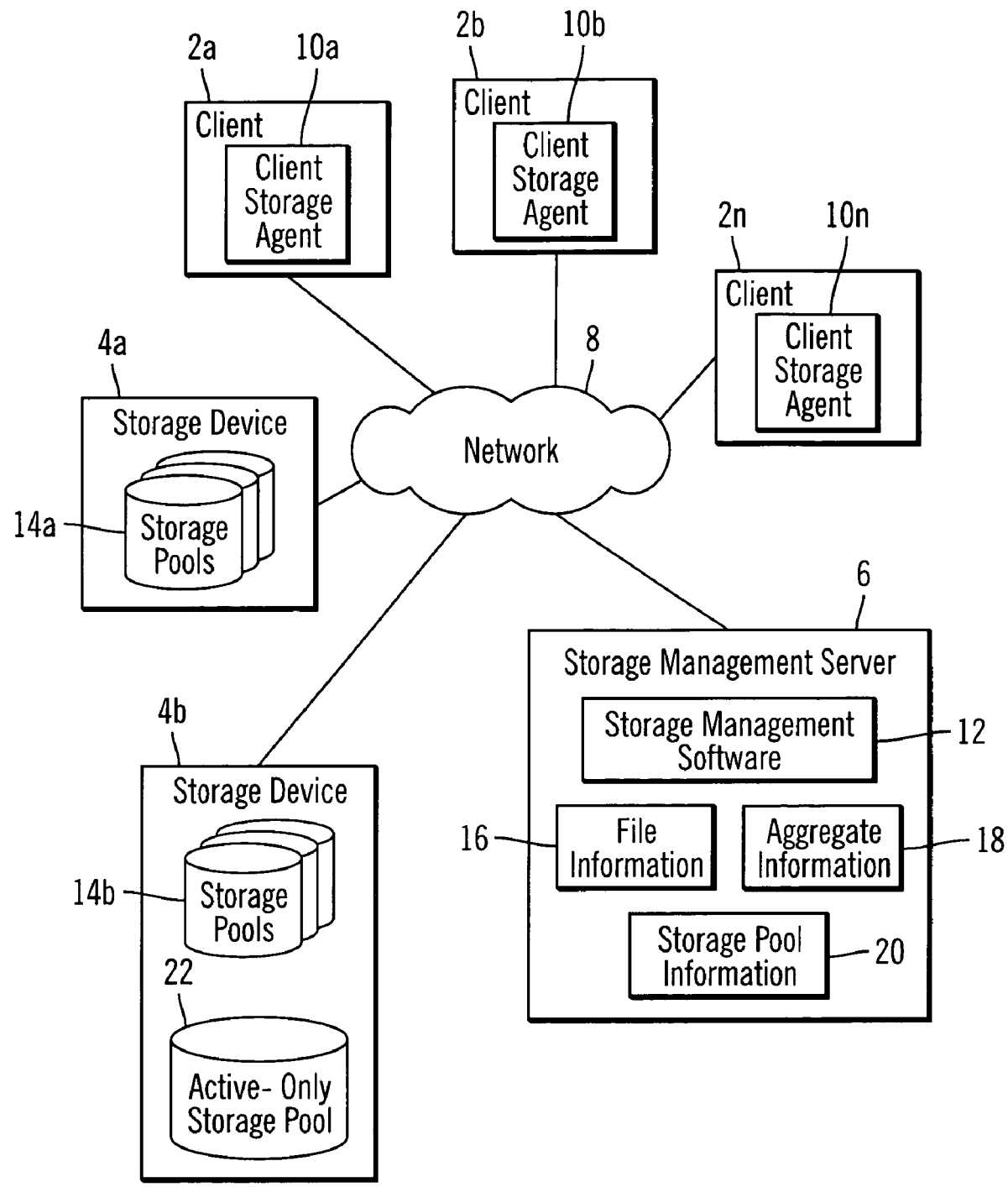
FIG. 1 illustrates an embodiment of a network computing environment.

FIG. 1 illustrates a computing environment in which embodiments are implemented. A plurality of clients 2a, 2b . . . 2n, storage devices 4a, 4b, and a storage management server 6 are in communication over a network 8. The storage management server 6 may access storage devices 4a, 4b over the network 8. Alternatively, a storage device may be attached directly to the storage management server 6 and accessed over a bus. The clients 2a, 2b . . . 2n include client storage agents 10a, 10b . . . 10n and the storage management server 6 includes storage management software 12. The client storage agents 10a, 10b . . . 10n and the storage management software 12 interact to manage the storage of files in storage pools 14a, 14b implemented in the storage devices 4a, 4b. The storage management software 12 may maintain a storage hierarchy system in which storage pools 14a, 14b are defined to have level information, such that files at a higher level may be migrated to a lower level according to a hierarchical storage policy, e.g., to move less frequently accessed files to storage pools at a lower level in the hierarchy having slower access devices. The storage in the higher level may comprise faster access devices, such as hard disk drives, whereas the storage at lower levels may comprise slower access devices, such as slower hard disk drives, tape drives, etc. For instance, storage pools high in the hierarchy include more frequently or recently used data and are implemented in relatively faster access storage devices, whereas storage pools lower in the hierarchy may provide more long term storage of data and be implemented in a tape storage medium. In certain embodiments, the client storage agents 10a, 10b . . . 10n may access, backup, archive and restore data through the storage management software 12, which manages access to files in the storage pools 14a, 14b. Further, the storage management software 12 may backup and archive data from the clients 2a, 2b, 2c.

The storage management software 12 maintains information on the files in the storage pools, including file information 16, aggregate information 18, and storage pool information 20. The information 16, 18, and 20 may be implemented in one or more database tables of a relational database or other suitable data structures known in the art. The file information 16 may comprise an inventory table having information on every file in the storage pools 14a, 14b, including client and policy information. The aggregate information 18 comprises information on aggregates defined in the storage pools 14a, 14b. A precursor aggregate comprises an association of files in the storage pools 14a, 14b, an aggregate managed file comprises a file or object in one storage pool in which one or more files are written and associated. Files grouped by a precursor aggregate are not stored in an aggregate managed file, but remain stored as separate files in the file system. An aggregate simplifies file movement operations (e.g., storage pool backup, restore, reclamation or movement to another pool which includes migration to another location within the hierarchy) because the storage management software 12 need only specify a data transfer operation with respect to an aggregate (precursor or aggregate managed file), and the storage management software 12 will then perform the requested operation with respect to the files grouped by the aggregate.

The storage pool information 20 contains information about where each managed file is stored in the storage hierarchy implemented in the storage pools 14a, 14b. The storage table contains an entry for each managed file.

A storage pool 14a, 14b may be implemented in a random access device or as a sequential access storage pool. A sequential access storage pool may be implemented in a sequential access media, e.g., tape, or in a sequential file volume in a random access media. When data is stored sequentially in a sequential file volume in a random access device, the volume is a file in the underlying file system. Space from a deleted file in a sequential-access disk pool is recovered by consolidating valid data on a new file volume during a reclamation operation. In a random-access disk pool, space is allocated in random blocks, such that once a file is deleted from a random-access storage pool, the space is immediately available for use.

In one embodiment, a storage pool may be defined as an active only storage pool 22, such that only active files are maintained in that storage pool 22, not inactive files. An inactive file is any file that has been deactivated according to some criteria. For instance, a file may be considered inactive if it is updated, deleted or is a file whose age exceeds an aging policy. A file may be updated or deleted on a client system 2a, 2b . . . 2n, and then when that update is supplied to the storage management server 6, the deactivated file may be marked as inactive. A file may also be deactivated directly by the storage management software 12. An update to a file results in both an active version of the file having the update and an inactive version of the pre-updated file.

The clients 2a, 2b . . . 2n may comprise a suitable computational device known in the art, such as a workstation, desktop computer, server, mainframe, hand held computer, telephony device, etc. The storage management server 6 may comprise a suitable server class machine. The network 8 may comprise a Local Area Network (LAN), Storage Area Network (SAN), Wide Area Network (WAN), wireless network, etc. The storage devices 4a, 4b may be implemented in storage devices known in the art, such as one hard disk drive, a plurality of interconnected hard disk drives configured as Direct Access Storage Device (DASD), Redundant Array of Independent Disks (RAID), Just a Bunch of Disks (JBOD), etc., a tape device, an optical disk device, a non-volatile electronic memory device (e.g., Flash Disk), a tape library, etc. The storage devices 4a, 4b may comprise random access devices, such as hard disk drives, electronic memory or storage, etc., where data may be written randomly to blocks in the storage device or sequential access devices where data must be written sequentially to the storage media, such as tape media.

Figure 2:
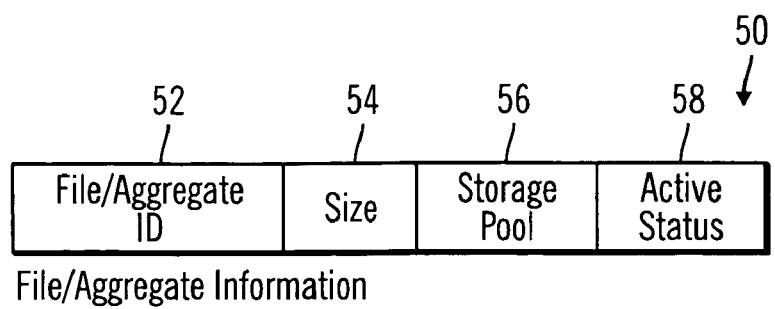
FIGS. 2, 3, and 4 illustrate embodiments of information on files and aggregates of files maintained in storage pools.

FIG. 2 illustrates an embodiment of file/aggregate information 50 maintained for every aggregate managed file and file outside of an aggregate managed file within a storage pool. The file/aggregate information 50 may be part of the aggregate information 18. Each file/aggregate information 50 instance includes an identifier (ID) 52 of the file or aggregate managed file; a size 54 (e.g., byte length) of the file or aggregate, where an aggregate size is the size of all files included in the aggregate managed file; and a storage pool 56 identifying the storage pool 14a, 14b, 22 including the file or aggregate managed file. A precursor aggregate may have a size 54 of zero, indicating it is a logical entity and an aggregate managed file may have a size 54 including its actual size, which includes the cumulative size of all files written to the aggregate managed file. For entries 50 for files, as opposed to aggregates, an active status field 58 indicates whether the file is active or inactive.

Figure 3:
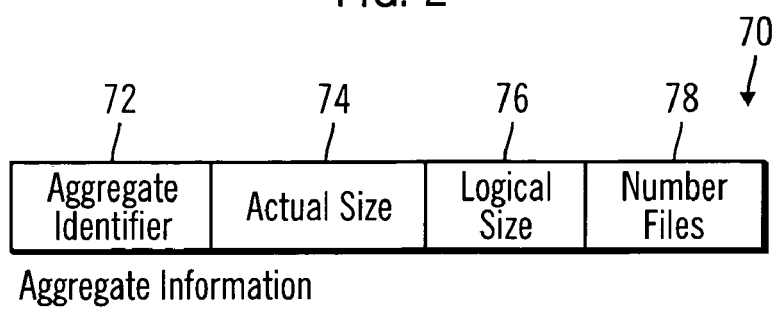

FIG. 3 illustrates an embodiment of aggregate information 70 maintained for every aggregate. The aggregate information 70 may be part of the aggregate information 18. Each aggregate information 70 instance includes: an identifier 72 of the aggregate; an actual size 74 of the aggregate managed file or a value indicating that the aggregate is a precursor aggregate, such as zero (a precursor aggregate may not have an actual size because it comprises an association of files and is not an object storing files); a logical size 76 including the size of all files associated with that aggregate; and a number of files 78 grouped by the aggregate (precursor or managed file). An aggregate managed file may have a logical size 76 equal to the cumulative size of the files written to the aggregate managed file and a precursor aggregate has a logical size of the files associated with the precursor aggregate.

Figure 4:
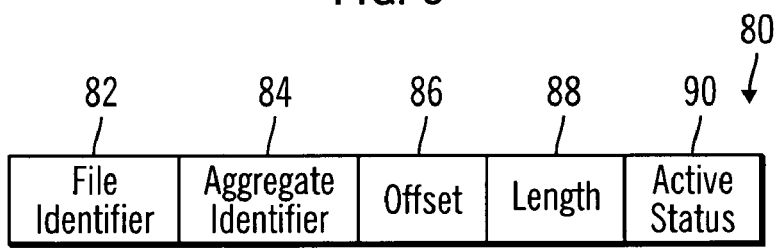

FIG. 4 illustrates an embodiment of aggregate file information 80 maintained for every file associated with an aggregate, i.e., a precursor aggregate or included in one aggregate managed file. The aggregate file information 80 may be part of the file information 16 or the aggregate information 18. Each aggregate file information 80 instance includes: a file identifier 82, such as the file name and location; an aggregate identifier 84 indicating the aggregate (precursor or managed file) in which the file is grouped; an offset 86 indicating the byte offset from the beginning of the aggregate managed file at which the file starts; a length 88 of the file; and an active status 90 indicating whether the file is active or inactive. A file associated with a precursor aggregate may have an offset 86 of zero or some other value indicating that the file is associated with a precursor aggregate. A file associated with a precursor aggregate may have a length 88 equal to the byte length of the file.

Figure 5:
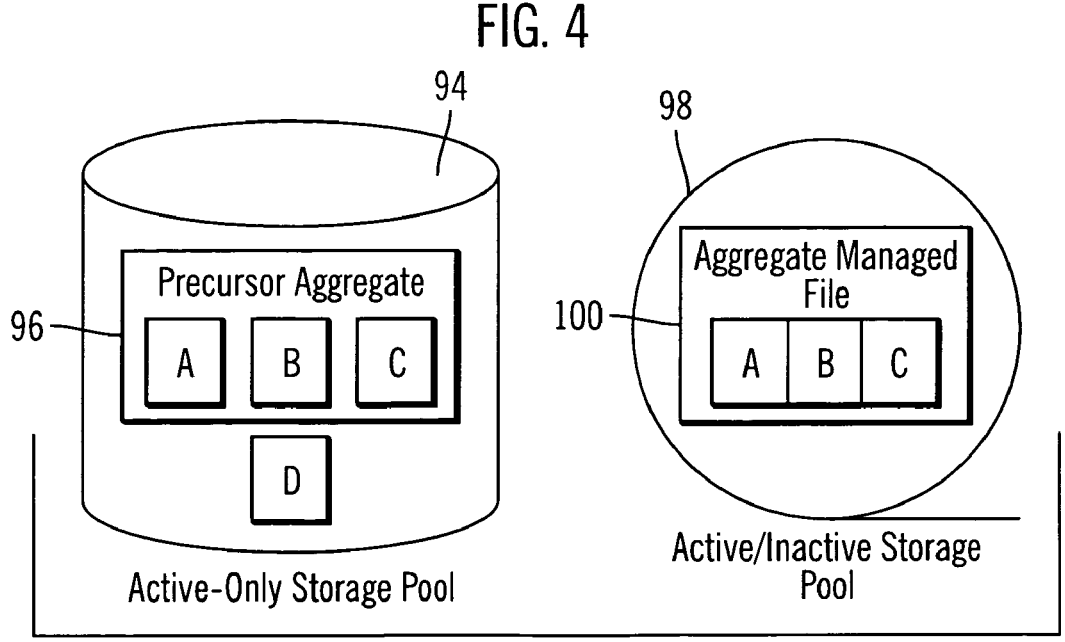
FIG. 5 illustrates an embodiment of an active-only storage pool.

FIG. 5 illustrates an active-only storage pool 94 implemented as a random access device in one of the storage devices 4a, 4b including one precursor aggregate 96 having three files A, B, C. The files A, B, C may be stored at non-sequential or sequential locations in the storage pool 94, and are shown as stored at non-sequential random locations. The active-only storage pool 94 may include additional precursor aggregates or aggregate managed files as well as files not included in an aggregate, such as large files that do not get aggregated. A file D is not associated with the precursor aggregate 96.

FIG. 5 further illustrates an active/inactive storage pool 98 in which data may be written sequentially and an aggregate managed file 100 in which files A, B, C are written sequentially. An active/inactive storage pool comprises either a copy storage pool or a primary storage pool. A copy storage pool is a secondary storage pool for receiving a copy of data from an active-only storage pool or maintaining a backup copy for disaster recovery. A primary storage pool contains both active and inactive files, and inactive files may be restored from the primary storage pool. The active/inactive storage pool 98 may be implemented in a sequential access media or in a sequential file volume in a random access media in which data is written sequentially. A sequential file volume comprises a file on a random access media, such as a hard disk drive, that is managed as a tape device where data is written sequentially. A storage pool can have multiple sequential file volumes including aggregate managed files. When the sequential file volume reaches a predefined size, then the sequential file volume is closed and a new sequential file volume is added to the storage pool to fill-up.

Figure 6:
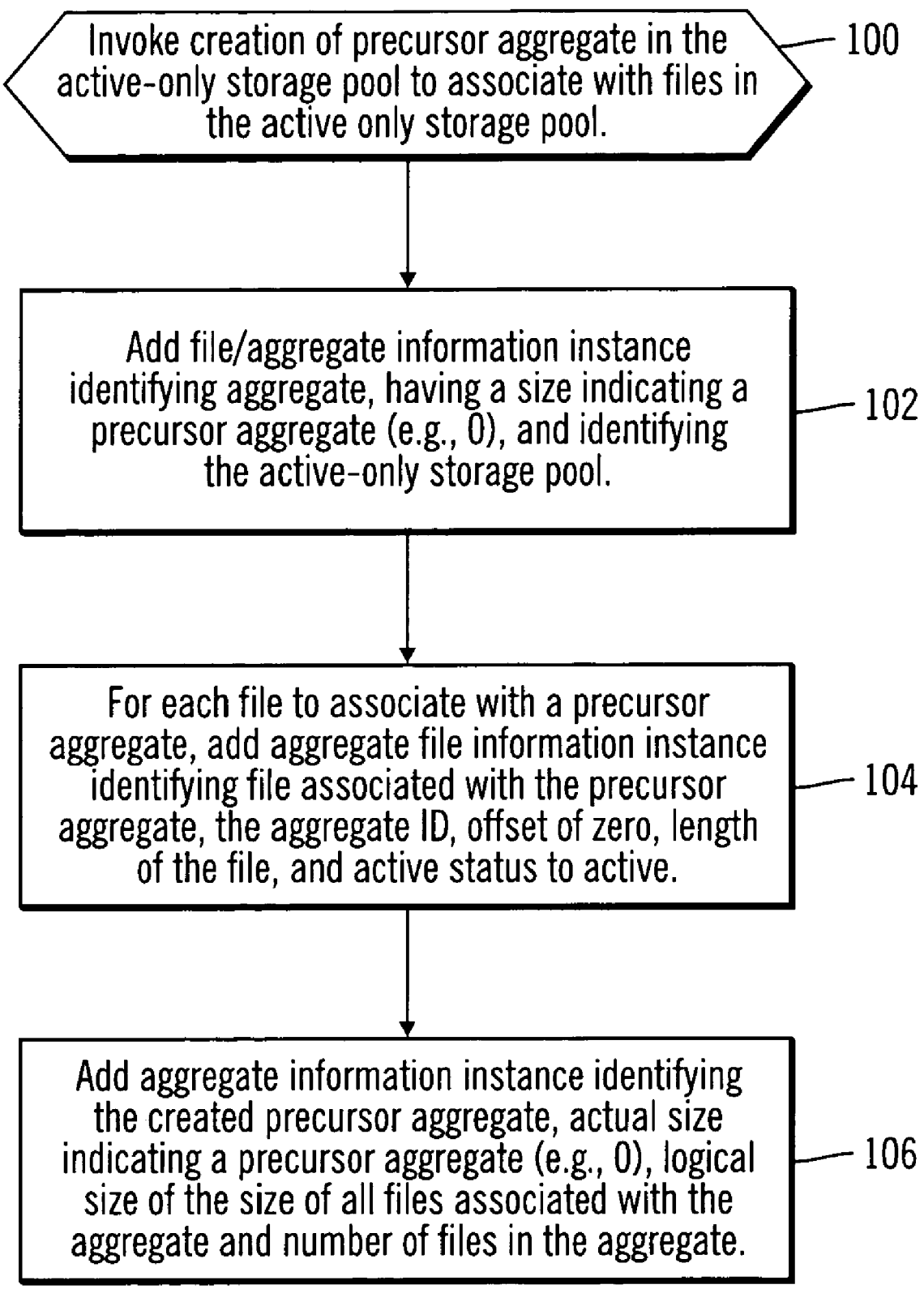
FIG. 6 illustrates an embodiment of operations to create a precursor aggregate in an active-only storage pool.

FIG. 6 illustrates operations performed by the storage management software 12 to create a precursor aggregate 96 in the active-only storage pool 94. The invocation of the storage management software 12 (at block 100) to create a precursor aggregate may be initiated by one client storage agent 10a, 10b . . . 10n or an administrator at the storage management server 6. A file/aggregate information 50 (FIG. 2) instance is added (at block 102) to the file information 16 identifying the precursor aggregate 52 being created, a size 54 indicating a precursor aggregate (e.g., 0), and an identifier in field 56 of the active-only storage pool 94 in which the precursor aggregate is created. For each file to associate with a precursor aggregate, an aggregate file information instance 80 (FIG. 4) is added (at block 104) to the file 16 or aggregate 18 information identifying the file 82 associated with the precursor aggregate, the precursor aggregate ID 84, an offset 86 of zero, a length 88 of the file, and a status 90 of the file being associated. The storage management software 12 further adds (at block 106) an aggregate information instance 70 (FIG. 3) identifying the created precursor aggregate ID 72, actual size 74 indicating a precursor aggregate (e.g., 0), a logical size 76 of the size of all files associated with the precursor aggregate and a number of files 78 associated with the precursor aggregate. When associating a new file with the precursor aggregate, the logical size 76 and number of files 78 would be updated to reflect the added file.

Figure 7:
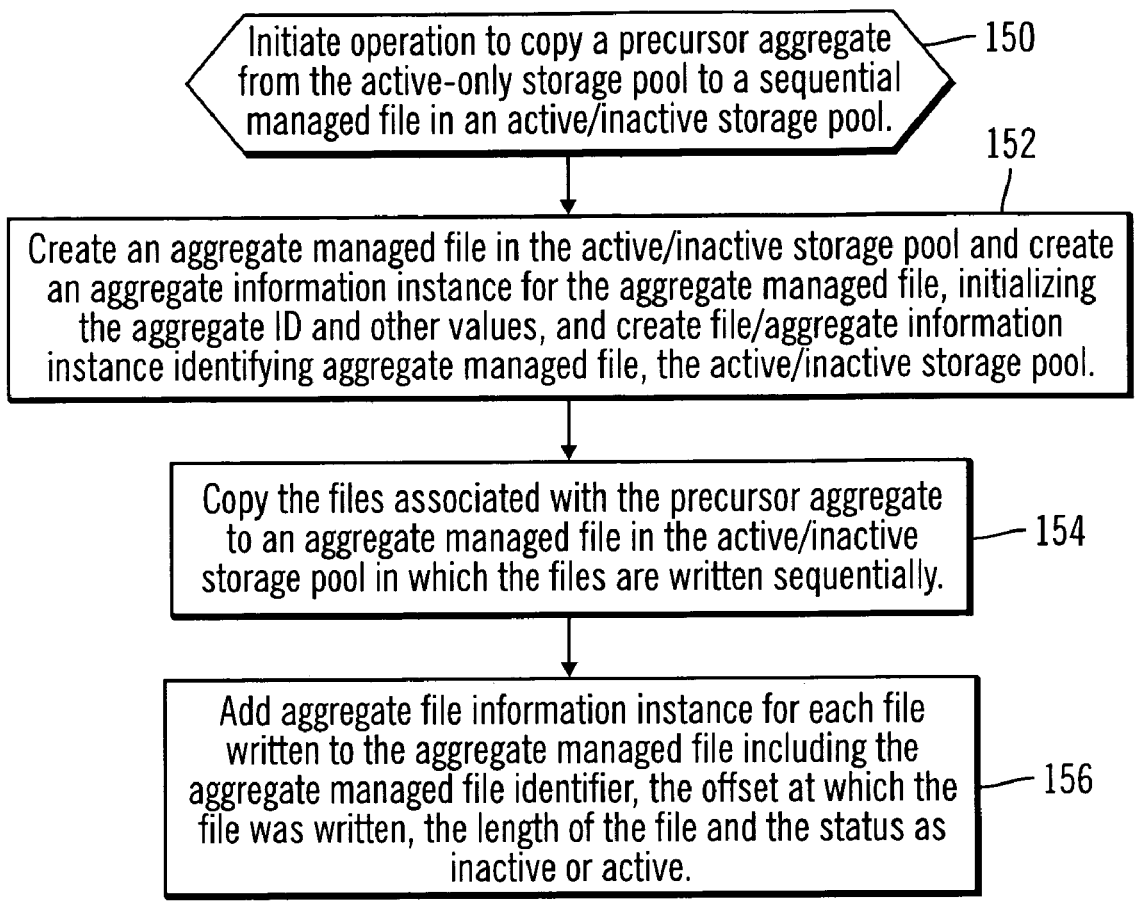
FIG. 7 illustrates an embodiment of operations to copy files in a precursor aggregate in the active-only storage pool.

FIG. 7 illustrates an embodiment of operations performed by the storage management software 12 to copy a precursor aggregate 96 from the active-only storage pool 94 to a target aggregate managed file 100 in an active/inactive storage pool 98, which may comprise a sequential access device or sequential file. The operations of FIG. 7 may further apply to the copying of files not included in an aggregate, such as file D (FIG. 5). Upon initiating (at block 150) the copy operation, the storage management software 12 creates (at block 152) an aggregate managed file 100 in the active/inactive storage pool 98 and creates an aggregate information instance 70 (FIG. 3) for the aggregate managed file, initializing the aggregate ID 72 and other values, and creates a file/aggregate information instance 50 (FIG. 2) identifying the created aggregate managed file 52 and the active/inactive storage pool 56. The files associated with the precursor aggregate 96 are copied (at block 154) to the created aggregate managed file 100 in the active/inactive storage pool 98 in which the files are written sequentially. The storage management software 12 adds (at block 156) an aggregate file information instance 80 (FIG. 4) for each file written to the aggregate 100 object including the aggregate managed file identifier 84, the offset 86 at which the file was written, the length of the file 88 and the status 90 as inactive or active. Further, the size field 54 in the file aggregate information 50 and the actual size 74, logical size 78, and number of files 78 fields in the aggregate information 70 are updated to reflect the size of the aggregate managed file 100 including the number of files written thereto.

Figure 8:
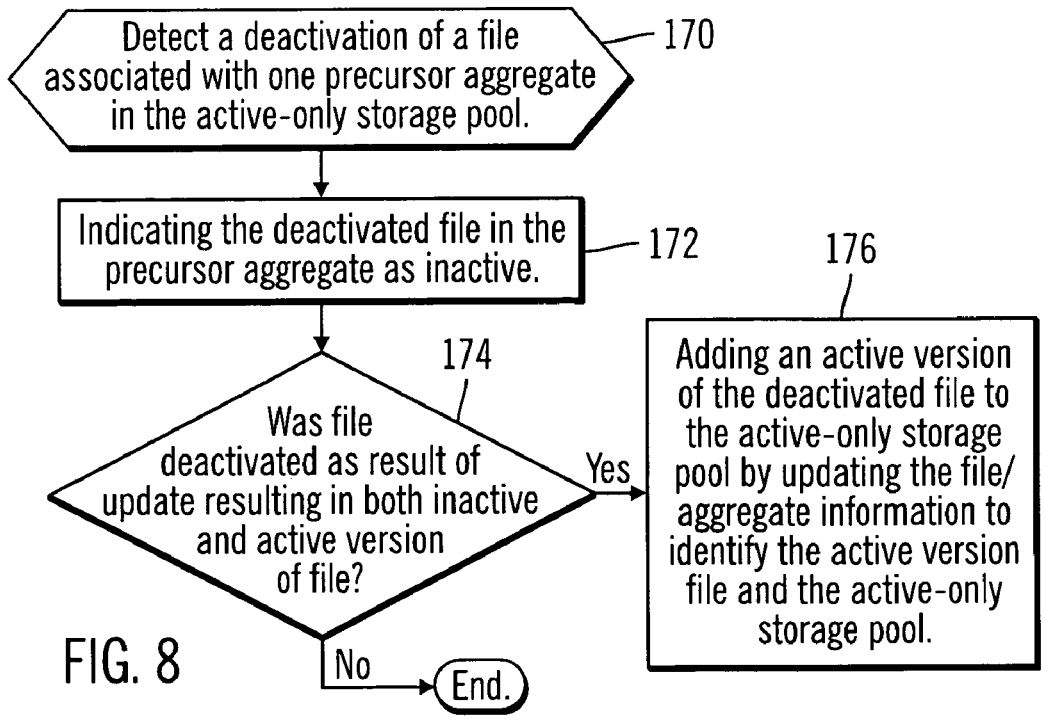
FIG. 8 illustrates an embodiment of operations to deactivate a file in a precursor aggregate in an active-only storage pool.

FIG. 8 illustrates an embodiment of operations performed by the storage management software 12 to process (at block 170) a deactivation of a file associated with one precursor aggregate 96 in the active-only storage pool 94. As mentioned a file may be deactivated if the file is updated, producing both an active version having the update and an inactive version. Certain deactivations may produce only an inactive version of the file, such as if the file is deleted or the file's age exceeds a policy criteria. In response to the deactivation, the storage management software 12 indicates (at block 172) the active status fields 58, 90 in the file/aggregate information 50 and aggregate file information 80 of the deactivated file associated with the precursor aggregate 96 as inactive. If (at block 174) the file was deactivated as a result of an update operation, then the active version is added (at block 176) to the active-only storage pool by updating the file/aggregate information 50 to identify the file or aggregate and the active-only storage pool. This operation may involve adding a file/aggregate information instance 50 (FIG. 2) for the updated file and assigning a new ID 52 and indicating the size 54 and storage pool 56 including the updated file. At this point, the active-only storage pool 94 includes inactive and active versions of the updated file. Further, files not part of an aggregate may have their status field 58 in their file/aggregate information 50 updated to indicate inactive when they are updated. Yet further, the updated active file may be stored in an aggregate with other files and/or copied to other storage pools, such as the active/inactive storage pool 98. If (at block 174) the file was not deactivated in a manner that results in both an active and inactive version, then control ends.

Figure 9:
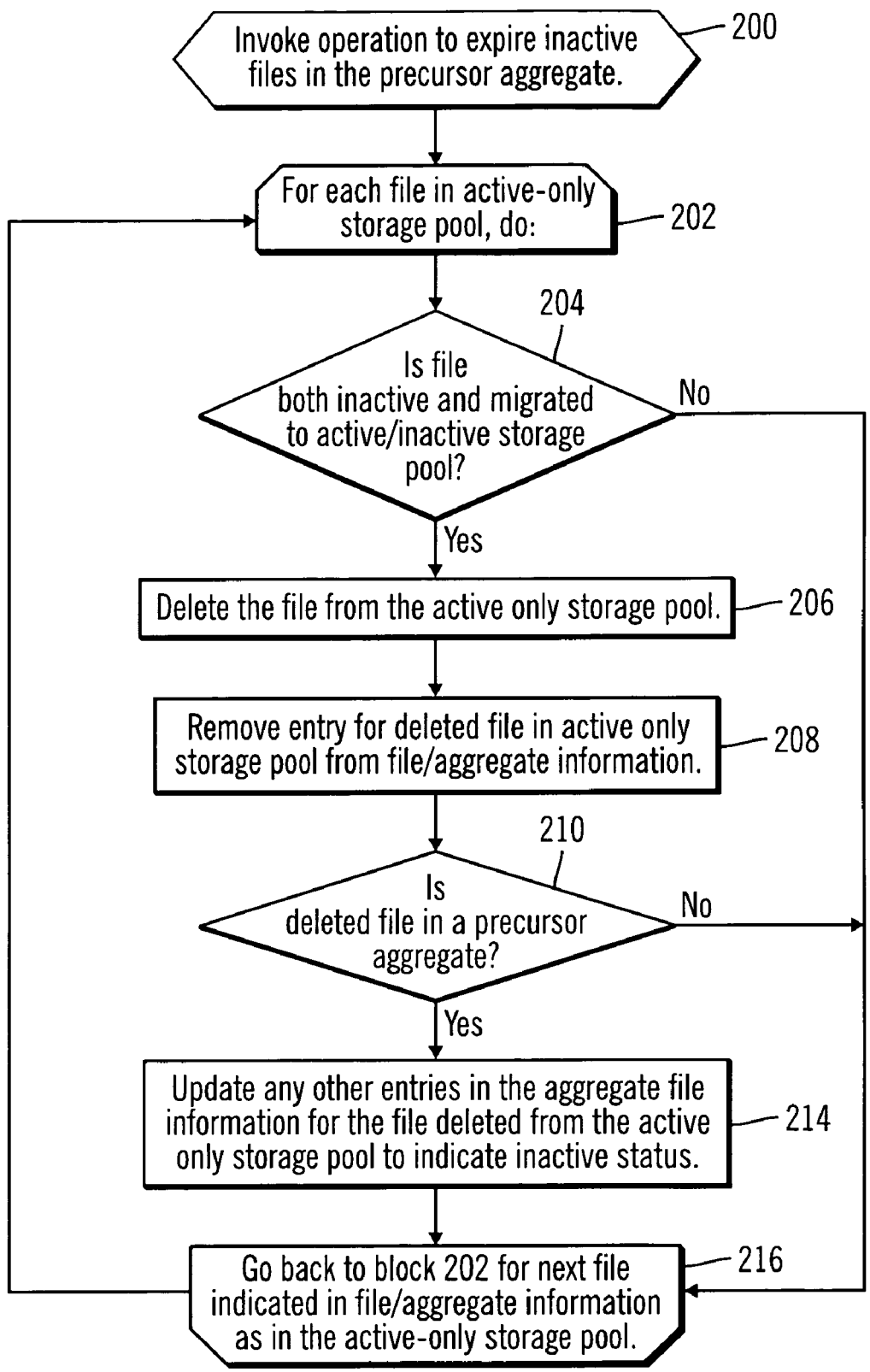
FIG. 9 illustrates an embodiment of operations to expire inactive files in the active-only storage pool.

FIG. 9 illustrates an embodiment of operations implemented by the storage management software 12 to expire inactive files in the active-only storage pool 94 in a random access device. In certain embodiments, a copy of the precursor aggregate in the active/inactive storage pool (made according to the operations of FIG. 7) occurs before inactive files are expired according to the operations of FIG. 9. At block 200, an operation is invoked to expire inactive files on one precursor aggregate 96 in the active-only storage pool 94. This operation may be invoked periodically or in response to an event, such as an update to files in the active-only aggregate. For each file in the active-only storage pool 94, a loop is performed at blocks 202 through 216. Files in the active only storage pool 94 may be determined as those files whose file/aggregate information instances 50 (FIG. 2) indicate in field 56 the active-only storage pool. If (at block 204) the file is active or inactive (which may be determined from status field 58 in the file/aggregate information 50 (FIG. 2) for the file being considered) and not migrated to the active/inactive storage pool 98, then control proceeds (at block 216) to consider a next file in the active-only storage pool 94. If (at block 204) the file is both inactive and migrated to the active/inactive storage pool 98, then the file is deleted (at block 206) from the active-only storage pool 94 and the file/aggregate information entry 50 (FIG. 2) for the deleted file identified in field 56 as in the active-only storage pool 96 is also removed (at block 208). The aggregate file information entry 80 for the deleted file that is also maintained in the aggregate managed file 100 in the active/inactive storage pool 98 may remain because the copy of the inactive file removed from the active-only storage pool 96 is maintained in the active/inactive storage pool 98.

If (at block 210) the deleted file is not in a precursor aggregate, then control proceeds to block 216 to consider a next file in the active-only storage pool 94. The storage management software 12 may determine that a removed file is in a precursor aggregate by determining whether there is an aggregate file information entry 80 for the removed file identifying the removed file as included in a precursor aggregate, which has an actual size 74 (FIG. 3) of zero. Otherwise, if (at block 210) the removed file is in a precursor aggregate, then the aggregate file information entry 80 having the ID 82 of the file deleted from the active only storage pool that is associated with another aggregate (precursor or managed file), as indicated in field 84, is updated (at block 214) to indicate the status 90 to inactive. In this way, only the entry 80 for the file removed from the active-only storage pool 94 is removed, and not entries 80 for the file in other storage pools. Thus, during expiration, files having an inactive status are deleted from precursor aggregates in the active-only storage pool 94, yet may remain as inactive files in other storage pools, such as the active/inactive storage pool 98.

Figure 10:
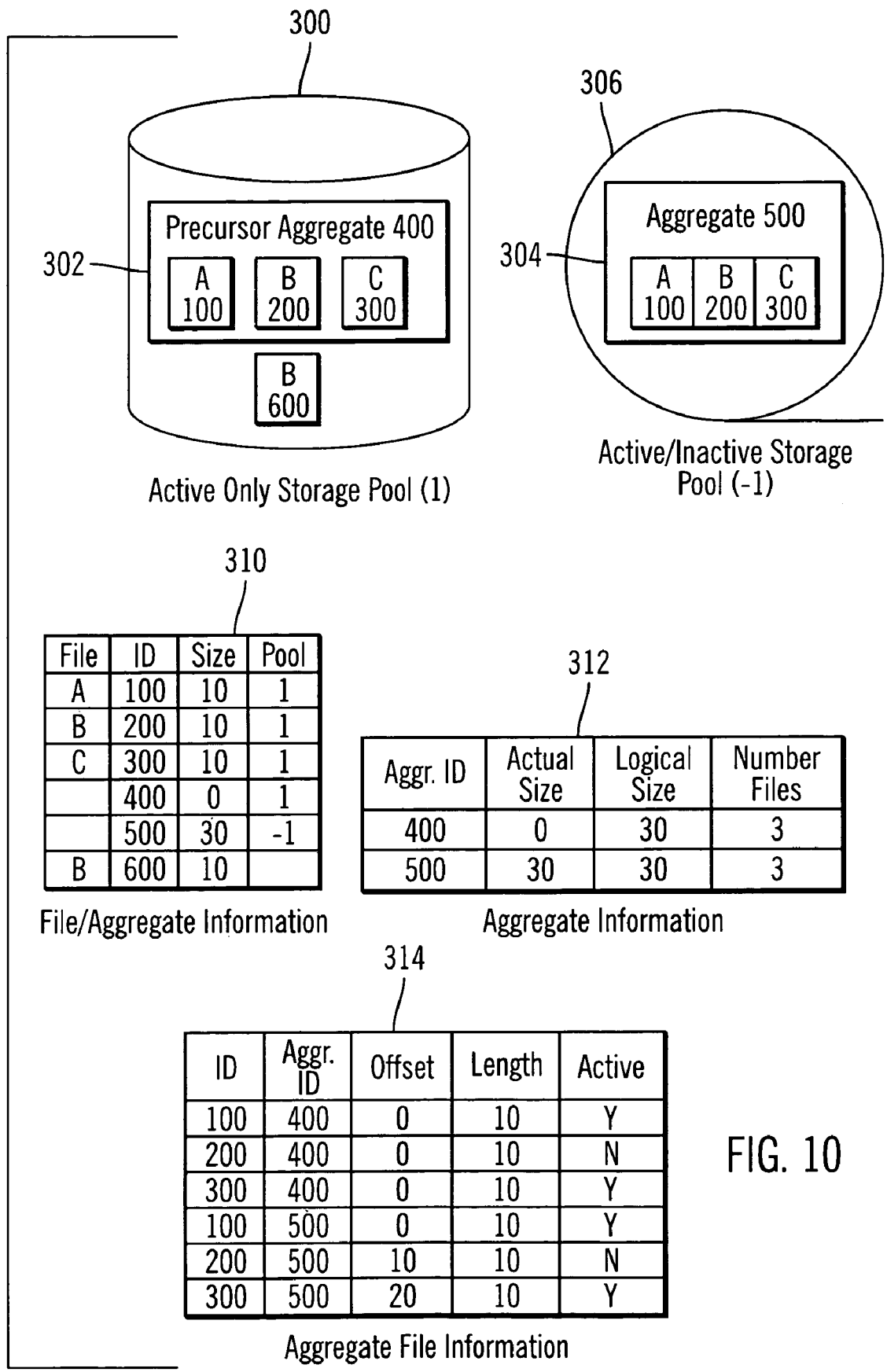
FIGS. 10 and 11 illustrate examples of an active-only storage pool, an active/inactive storage pool, and tables of information on the files and aggregates in the active-only and active/inactive storage pools.

FIG. 10 illustrates an example of storage pools and tables having information on the aggregates in the storage pools. An active only storage pool 300, having an ID of "1", is implemented in a random access media including three files A, B, C having IDs of 100, 200, 300, respectively. These files A, B, C are grouped in a precursor aggregate 302 having an ID of 400. Before updating files in the active-only storage pool 300, a copy is made of the files associated with the precursor aggregate 302 to an aggregate managed file 304, having an ID of 500, in the active/inactive storage pool 306, having an ID of "−1". The active/inactive storage pool 306 may comprise a sequential access device or store files and aggregate managed files in a sequential file volume. File B 600 comprises an updated version of file B 200 associated with the precursor aggregate 302. Any changes to files associated with the precursor aggregate 302 does not effect the copy of the files in the aggregate managed file 304 in the active/inactive storage pool 306, other than changing the status of the copy of the files from active to inactive. File B may also be copied to the active/inactive storage pool 306.

In one embodiment, the storage management software 12 maintains a file/aggregate information table 310, an aggregate information table 312, and an aggregate file information table 314 having information on the files and aggregates in the storage pools 300 and 306. The file/aggregate information table 310 includes entries, such as entry 50 (FIG. 2), for each aggregate, including entries for precursor aggregate 400 and aggregate managed file 500 (having reference numbers 302 and 304, respectively) that are in the storage pools identified as 1 and "−1" (having reference numbers 300 and 306, respectively) and the updated file B having identifier 600.

The aggregate file information table 314 includes entries, such as entry 80 (FIG. 4), for each file in the aggregates 302 and 304. The files in the precursor aggregate 302 have offsets of zero and the files in the aggregate managed file 304 have offsets of their location in the aggregate managed file. In FIG. 10, the aggregate information 312 has information on the precursor aggregate 302 and the aggregate managed file 304, including an actual size field of zero for precursor aggregate 400 indicating that the aggregate is a precursor. The table 314 further indicates whether the file is active, "Y" or active and "N" for inactive.

Figure 11:
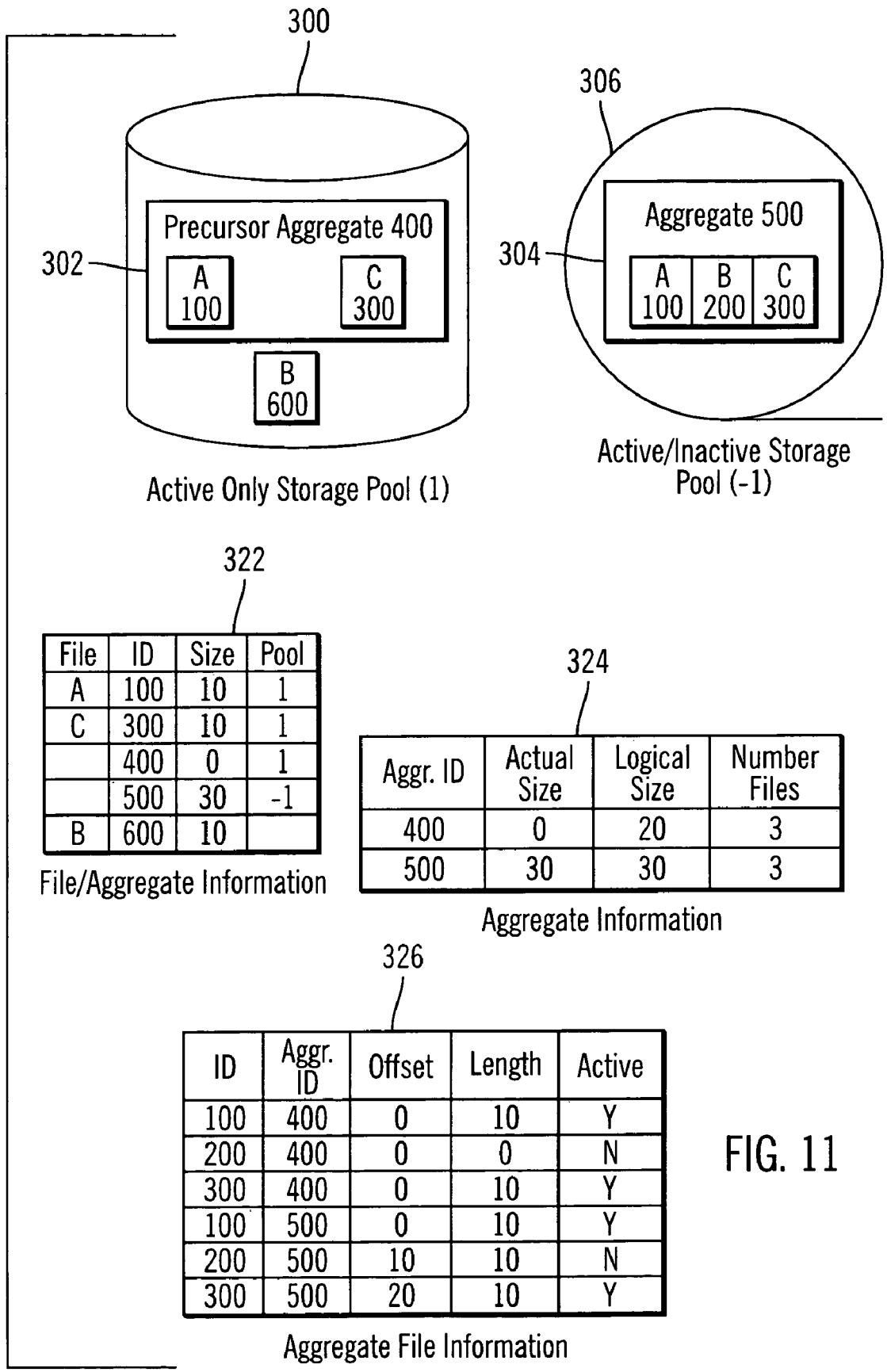

FIG. 11 illustrates an example of storage pools and tables having information on the aggregates in the storage pools after expiration occurs with respect to the storage pool 302 in FIG. 10. FIG. 11 shows storage pools 300 and 306 as in FIG. 10 and precursor aggregate 302 in storage pool 300 and aggregate managed file 304 in storage pool 306. However, in the active-only storage pool 300, the updated file B was deleted from the precursor aggregate 302 by updating the information defining the precursor aggregate according to the operations of FIG. 9. However, the inactive file B 200 remains in the aggregate managed file 304 (having ID 500) in the active/inactive storage pool 306. The updated file B 600 is also in the active-only storage pool 300.

The updated file/aggregate information table 322 for FIG. 11 includes the entries from FIG. 10, with the entry for the inactive file B 200 removed from the active-only storage pool as a result of expiration, leaving only an entry for the updated file B 600. The entry in the updated aggregate information table 324 for the precursor aggregate 400 is updated to include the new logical size of 20 to reflect that a file was removed. The entry in the aggregate file information table 326 for file B 200 in the precursor aggregate 400 is updated to indicate the inactive status. However, the length is set to 0 to indicate that that file B 200 is no longer included in the precursor aggregate 96. In this embodiment, all inactive files are removed from the precursor aggregate 96 in the active-only storage pool 94 and the inactive file is maintained in the aggregate managed file 304 in the active/inactive storage pool 306.

Described embodiments provide an active only storage pool implemented in a random access media, such that any files in a precursor aggregate in the active-only storage pool that become inactive as a result of an update or other deactivation are removed from the active only storage pool and precursor aggregate during an expiration operation. Further, by maintaining only active only files in a storage pool, the client may restore the active data faster from either the active-only storage pool or a backup copy of the precursor aggregate having active data, which may be on disk or tape. In this way, the active files may be streamed from the aggregate managed file on the tape or disk media. This allows the client to restore the active files faster, which the client is more likely to need than inactive files.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. Of course, those skilled in the art will recognize that many modifications may be made to this configuration without departing from the scope of the present invention, and that the article of manufacture may comprise suitable information bearing medium known in the art.

In described embodiments, the aggregate managed files in which files are written were contained in a sequential access media, such as a sequential disk or tape. In an alternative embodiment, the described operations may apply to an aggregate managed file in a random access media.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

Further, when a reference letter, such as "a", "b", or "n" is used to denote a certain number of items, the reference "a", "b" or "n" used with different elements may indicate the same or different number of such elements.

FIGS. 2, 3, 4, 10, and 11 show information maintained in a certain format. In alternative embodiments, the information shown in FIGS. 2, 3, 4, 10, and 11 may be maintained in alternative data structures and formats, and in different combinations.

The illustrated operations of FIGS. 6, 7, 8, and 9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
providing an active-only storage pool in a random access device, wherein the active-only storage pool is intended to include only active files and not inactive versions of files;
associating a plurality of files in the active-only storage pool with a precursor aggregate in the active-only storage pool, wherein the precursor aggregate comprises a logical entity providing an association of files;
deactivating one file associated with the precursor aggregate in the active only storage pool to produce an inactive version of the deactivated file, wherein the precursor aggregate is associated with the inactive version of the file in response to the deactivation;
determining the inactive version of at least one file in the precursor aggregate;
copying the files associated with the precursor aggregate to an aggregate managed file in an additional storage pool, wherein the aggregate managed file maintains the inactive version of the at least one file deleted from the active only storage pool, wherein files are maintained in a sequential ordering in the aggregate managed file and wherein the files in the aggregate managed file are written sequentially;
determining whether an inactive file in the precursor aggregate in the active-only storage pool is inactive and has been copied to the aggregate managed file in the additional storage pool;
deleting the determined inactive version of the file from the active only storage pool and the precursor aggregate association in response to determining that the inactive file was copied to the aggregate managed file in which files are maintained in the sequential ordering and
maintaining aggregate information for the aggregate managed file and the precursor aggregate, wherein the information for each of the aggregate managed file and the precursor aggregate indicates the aggregate managed file or precursor aggregate identifier, a number of files in the aggregate managed file or associated with the precursor aggregate, and a field indicating a size of the aggregate managed file or an indication of a precursor aggregate.

2. The method of claim 1, wherein the file is deactivated as a result of an update to the file, wherein updating the file produces an active version of the file in addition to the inactive version of the file, further comprising:
removing an indication of the association of the deleted inactive version of the at least one file with the precursor aggregate, wherein the precursor aggregate is associated with only the active version of files in response to removing the indication.

3. The method of claim 1, wherein the additional storage pool is implemented in a sequential access device.

4. The method of claim 1, wherein the precursor aggregate has a first identifier and the aggregate managed file has a second identifier, further comprising:
providing a data structure having information on defined aggregates including an aggregate identifier and storage pool including the aggregate for each indicated aggregate; and
indicating in the information for the aggregate identified by one aggregate identifier whether the aggregate is a precursor aggregate comprising an association of files or an aggregate managed file in which files are written.

5. The method of claim 4, wherein indicating in the data structure information that the aggregate is the precursor aggregate comprises indicating that the precursor aggregate has an aggregate size of zero and wherein indicating in the information that the aggregate is the aggregate managed file comprises indicating that the aggregate managed file has an aggregate size that is a cumulative size of the files written in the aggregate managed file.

6. The method of claim 5, wherein the information for each aggregate in the data structure includes a logical size and an actual size, wherein indicating that the precursor aggregate has the aggregate size of zero comprises indicating that the actual size of the precursor aggregate is zero and wherein indicating that the aggregate managed file has the aggregate size that is the cumulative size comprises indicating that the actual size of the aggregate managed file is the cumulative size, further comprising:
indicating in the information for the precursor aggregate and the aggregate managed file that the logical size is the cumulative size of the files associated with the precursor aggregate and written to the aggregate managed file, respectively.

7. The method of claim 4, wherein the file is deactivated as a result of an update to the file, wherein updating the file produces an active version of the file in addition to the inactive version of the file, farther comprising:
adding information to the data structure for the updated file having a third identifier and indicating that the updated file is in the active-only storage pool.

8. The method of claim 4, wherein the data structure comprises a first data structure, further comprising:
providing a second data structure having information on each file grouped in one aggregate including the aggregate identifier of the aggregate including the file, wherein the aggregate identifier for the files associated with the precursor aggregate comprises the first identifier and wherein the aggregate identifier for the files written to the aggregate managed file comprises the second identifier.

9. The method of claim 8, farther comprising:
deleting the information in the second data structure for the inactive version of the at least one file having the first identifier that was deleted from the active storage pool, wherein the second data structure includes information on the inactive version of the at least one file having the second identifier maintained in the aggregate managed file.

10. The method of claim 8, wherein the information for the files in the second data structure indicates an offset and file size of the file, wherein files associated with one precursor aggregate have an offset of zero and wherein files included in one aggregate managed file have an offset at which the file is stored in the aggregate managed file.

11. The method of claim 1, further comprising:
maintaining aggregate file information having an entry for each file stored in the aggregate managed file or associated with the precursor aggregate, wherein each entry indicates a file identifier, an identifier of the aggregate managed file or the precursor aggregate, and an ordering of the file in the aggregate managed file, wherein the sequential ordering of files in the aggregate managed file is indicated by the order indicated in the entries for the files of the aggregate managed file in the aggregate file information.

12. The method of claim 11, wherein the ordering of the file in the aggregate file information indicates a precursor aggregate for a file associated with the precursor aggregate.

13. The method of claim 11, wherein the order indicated in the entries in the aggregate file information comprises an offset indicating an offset of the file in the aggregate managed file, wherein the files in the aggregate managed file are written according to an order of their offsets indicated in the file entries in the aggregate file information.

14. The method of claim 11, further comprising:
adding entries to the aggregate file information for each file associated with the precursor aggregate copied to the aggregate managed file, wherein each added entry identifies the copied file, the aggregate managed file, identifier, and an order in which the file was written to the aggregate managed file.

15. The method of claim 11, wherein the sequential ordering of the files in the aggregate managed file is indicated in aggregate file information.

16. A system in communication with a random access device, comprising:
a processor;
a computer readable medium including a program executed by the processor to perform operations, the operations comprising:
providing an active-only storage pool in a random access device, wherein the active-only storage pool is intended to include only active files and not inactive versions of files;
associating a plurality of files in the active-only storage pool with a precursor aggregate in the active-only storage pool, wherein the precursor aggregate comprises a logical entity providing an association of files;
deactivating one file associated with the precursor aggregate in the active only storage pool to produce an inactive version of the deactivated file, wherein the precursor aggregate is associated with the inactive version of the file in response to the deactivation;
determining the inactive version of at least one file in the precursor aggregate;
copying the files associated with the precursor aggregate to an aggregate managed file in an additional storage pool, wherein the aggregate managed file maintains the inactive version of the at least one file deleted from the active only storage pool, wherein files are maintained in a sequential ordering in the aggregate managed file, and wherein the files in the aggregate managed file are written sequentially;
determining whether an inactive file in the precursor aggregate in the active-only storage pool is inactive and has been copied to the aggregate managed file in the additional storage pool; and
deleting the determined inactive version of the file from the active only storage pool and the precursor aggregate association in response to determining that the inactive file was copied to the aggregate managed file in which files are maintained in the sequential ordering.

17. The system of claim 16, wherein the file is deactivated as a result of an update to the file, wherein updating the file produces an active version of the file in addition to the inactive version of the file, wherein the operations further comprise:
removing an indication of the association of the deleted inactive version of the at least one file with the precursor aggregate, wherein the precursor aggregate is associated with only the active version of files in response to removing the indication.

18. The system of claim 16, wherein the precursor aggregate has a first identifier and the aggregate managed file has a second identifier, wherein the operations further comprise:
providing a data structure having information on defined aggregates including an aggregate identifier and storage pool including the aggregate for each indicated aggregate; and
indicating in the information for the aggregate identified by one aggregate identifier whether the aggregate is a precursor aggregate comprising an association of files or an aggregate managed file in which files are written.

19. The system of claim 18, wherein indicating in the data structure information that the aggregate is the precursor aggregate comprises indicating that the precursor aggregate has an aggregate size of zero and wherein indicating in the information that the aggregate is the aggregate managed file comprises indicating that the aggregate managed file has an aggregate size that is a cumulative size of the files written in the aggregate managed file.

20. The system of claim 19, wherein the information for each aggregate in the data structure includes a logical size and an actual size, wherein indicating that the precursor aggregate has the aggregate size of zero comprises indicating that the actual size of the precursor aggregate is zero and wherein indicating that the aggregate managed file has the aggregate size that is the cumulative size comprises indicating that the actual size of the aggregate managed file is the cumulative size, wherein the operations further comprise:
indicating in the information for the precursor aggregate and the aggregate managed file that the logical size is the cumulative size of the files associated with the precursor aggregate and written to the aggregate managed file, respectively.

21. The system of claim 18, wherein the file is deactivated as a result of an update to the file, wherein updating the file produces an active version of the file in addition to the inactive version of the file, wherein the operations further comprise:

adding information to the data structure for the updated file having a third identifier and indicating that the updated file is in the active-only storage pool.

22. The system of claim 18, wherein the data structure comprises a first data structure, wherein the operations further comprise:

providing a second data structure having information on each file grouped in one aggregate including the aggregate identifier of the aggregate including the file, wherein the aggregate identifier for the files associated with the precursor aggregate comprises the first identifier and wherein the aggregate identifier for the files written to the aggregate managed file comprises the second identifier.

23. The system of claim 22, wherein the operations further comprise:

deleting the information in the second data structure for the inactive version of the at least one file having the first identifier that was deleted from the active storage pool, wherein the second data structure includes information on the inactive version of the at least one file having the second identifier maintained in the aggregate managed file.

24. The system of claim 16, wherein the operations further comprise:

maintaining aggregate file information having an entry for each file stored in the aggregate managed file or associated with the precursor aggregate, wherein each entry indicates a file identifier, an identifier of the aggregate managed file or the precursor aggregate, and an ordering of the file in the aggregate managed file, wherein the sequential ordering of files in the aggregate managed file is indicated by the order indicated in the entries for the files of the aggregate managed file in the aggregate file information.

25. The system of claim 24, wherein the ordering of the file in the aggregate file information indicates a precursor aggregate for a file associated with the precursor aggregate.

26. The system of claim 24, wherein the order indicated in the entries in the aggregate file information comprises an offset indicating an offset of the file in the aggregate managed file, wherein the files in the aggregate managed file are written according to an order of their offsets indicated in the file entries in the aggregate file information.

27. The system of claim 24, wherein the operations further comprise: adding entries to the aggregate file information for each file associated with the precursor aggregate copied to the aggregate managed file, wherein each added entry identifies the copied file, the aggregate managed file, identifier, and an order in which the file was written to the aggregate managed file.

28. The system of claim 24, wherein the sequential ordering of the files in the aggregate managed file is indicated in aggregate file information.

29. An article of manufacture comprising a computer readable storage medium having code executed to communicate with a random access device and to perform operations, the operations comprising:

providing an active-only storage pool in a random access device, wherein the active-only storage pool is intended to include only active files and not inactive versions of files;

associating a plurality of files in the active-only storage pool with a precursor aggregate in the active-only storage pool, wherein the precursor aggregate comprises a logical entity providing an association of files;

deactivating one file associated with the precursor aggregate in the active only storage pool to produce an inactive version of the deactivated file, wherein the precursor aggregate is associated with the inactive version of the file in response to the deactivation;

determining the inactive version of at least one file in the precursor aggregate;

copying the files associated with the precursor aggregate to an aggregate managed file in an additional storage pool, wherein the aggregate managed file maintains the inactive version of the at least one file deleted from the active only storage pool, wherein files are maintained in a sequential ordering in the aggregate managed file, and wherein the files in the aggregate managed file are written sequentially;

determining whether an inactive file in the precursor aggregate in the active-only storage pool is inactive and has been copied to the aggregate managed file in the additional storage pool; and deleting the determined inactive version of the file from the active only storage pool and the precursor aggregate association in response to determining that the inactive file was copied to the aggregate managed file in which files are maintained in the sequential ordering.

30. The article of manufacture of claim 29, wherein the file is deactivated as a result of an update to the file, wherein updating the file produces an active version of the file in addition to the inactive version of the file, wherein the operations further comprise:

removing an indication of the association of the deleted inactive version of the at least one file with the precursor aggregate, wherein the precursor aggregate is associated with only the active version of files in response to removing the indication.

31. The article of manufacture of claim 29, wherein the precursor aggregate has a first identifier and the aggregate managed file has a second identifier, wherein the operations further comprise:

providing a data structure having information on defined aggregates including an aggregate identifier and storage pool including the aggregate for each indicated aggregate; and indicating in the information for the aggregate identified by one aggregate identifier whether the aggregate is a precursor aggregate comprising an association of files or an aggregate managed file in which files are written.

32. The article of manufacture of claim 31, wherein indicating in the data structure information that the aggregate is the precursor aggregate comprises indicating that the precursor aggregate has an aggregate size of zero and wherein indicating in the information that the aggregate is the aggregate managed file comprises indicating that the aggregate managed file has an aggregate size that is a cumulative size of the files written in the aggregate managed file.

33. The article of manufacture of claim 32, wherein the information for each aggregate in the data structure includes a logical size and an actual size, wherein indicating that the precursor aggregate has the aggregate size of zero comprises indicating that the actual size of the precursor aggregate is zero and wherein indicating that the aggregate managed file has the aggregate size that is the cumulative size comprises indicating that the actual size of the aggregate managed file is the cumulative size, wherein the operations farther comprise:

indicating in the information for the precursor aggregate and the aggregate managed file that the logical size is the cumulative size of the files associated with the precursor aggregate and written to the aggregate managed file, respectively.

34. The article of manufacture of claim 31, wherein the file is deactivated as a result of an update to the file, wherein updating the file produces an active version of the file in addition to the inactive version of the file, wherein the operations further comprise:

adding information to the data structure for the updated file having a third identifier and indicating that the updated file is in the active-only storage pool.

35. The article of manufacture of claim 31, wherein the data structure comprises a first data structure, wherein the operations further comprise:

providing a second data structure having information on each file grouped in one aggregate including the aggregate identifier of the aggregate including the file, wherein the aggregate identifier for the files associated with the precursor aggregate comprises the first identifier and wherein the aggregate identifier for the files written to the aggregate managed file comprises the second identifier.

36. The article of manufacture of claim 35, wherein the operations further comprise:

deleting the information in the second data structure for the inactive version of the at least one file having the first identifier that was deleted from the active storage pool, wherein the second data structure includes information on the inactive version of the at least one file having the second identifier maintained in the aggregate managed file.

37. The article of manufacture of claim 29, wherein the operations further comprise:

maintaining aggregate file information having an entry for each file stored in the aggregate managed file or associated with the precursor aggregate, wherein each entry indicates a file identifier, an identifier of the aggregate managed file or the precursor aggregate, and an ordering of the file in the aggregate managed file, wherein the sequential ordering of files in the aggregate managed file is indicated by the order indicated in the entries for the files of the aggregate managed file in the aggregate file information.

38. The article of manufacture of claim 37, wherein the ordering of the file in the aggregate file information indicates a precursor aggregate for a file associated with the precursor aggregate.

39. The article of manufacture of claim 37, wherein the order indicated in the entries in the aggregate file information comprises an offset indicating an offset of the file in the aggregate managed file, wherein the files in the aggregate managed file are written according to an order of their offsets indicated in the file entries in the aggregate file information.

40. The article of manufacture of claim 37, wherein the operations further comprise:

adding entries to the aggregate file information for each file associated with the precursor aggregate copied to the aggregate managed file, wherein each added entry identifies the copied file, the aggregate managed file, identifier, and an order in which the file was written to the aggregate managed file.

41. The article of manufacture of claim 37, wherein the sequential ordering of the files in the aggregate managed file is indicated in aggregate file information.

* * * * *

UNITED STATES PATENT AND TRADEMARK OFFICE
CERTIFICATE OF CORRECTION

PATENT NO. : 7,634,516 B2 Page 1 of 1
APPLICATION NO. : 11/206496
DATED : December 15, 2009
INVENTOR(S) : Cannon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 296 days.

Signed and Sealed this

Ninth Day of November, 2010

David J. Kappos
*Director of the United States Patent and Trademark Office*